United States Patent [19]

Etter

[11] 4,133,034

[45] Jan. 2, 1979

[54] METHOD AND MEANS OF ASSIMILATING UTILITY METER DATA

[76] Inventor: Berwyn E. Etter, 368 Boca Ciega Point Blvd. So., Madeira Beach, Fla. 33708

[21] Appl. No.: 819,350

[22] Filed: Jul. 27, 1977

[51] Int. Cl.[2] .......... G06K 1/00

[52] U.S. Cl. .......... 364/464; 235/432; 364/483; 364/900

[58] Field of Search .......... 364/200, 900, 401, 403, 364/464, 483, 709; 235/152, 151.3, 151.31, 61.9 R, 61.6 R, 156; 340/149 R

[56] References Cited

U.S. PATENT DOCUMENTS

| | | | |
|---|---|---|---|
| 3,344,408 | 9/1967 | Singer et al. | 364/900 |
| 3,590,220 | 6/1971 | Ishida et al. | 235/61.9 R |
| 3,842,248 | 10/1974 | Yarnell et al. | 235/156 |
| 3,932,730 | 1/1976 | Ambrosio | 235/61.9 R |
| 3,956,740 | 5/1976 | Jones et al. | 364/200 |
| 4,007,443 | 2/1977 | Bromberg et al. | 364/900 |
| 4,025,766 | 5/1977 | Ng et al. | 235/152 |

*Primary Examiner*—Charles E. Atkinson
*Assistant Examiner*—Errol A. Krass
*Attorney, Agent, or Firm*—Zarley, McKee, Thomte, Voorhees & Sease

[57] ABSTRACT

A method of assimilating utility meter data at the meter locations by accumulating on an input tape customer profile information for a plurality of meter customers, including the customer's account number, service address, meter number, customer name, previous reading date and meter reading, utility rate factors and debit/-credit transactions. The input tape is then placed in a portable computer capable of being manually carried to the site of a given meter. The portable computer has the capability of updating, printing and visually presenting various of the customer profile information before and after receiving current customer profile information. The computer is actuated to visually present at least the meter number and customer address of a given meter customer. The current meter reading is then placed in the computer which is then actuated to calculate the charge for the utility usage based upon the previous meter reading and the current meter reading. The computer is then actuated to print a bill for the meter customer, and the computer imposes on an output tape the updated customer profile information. The printed bill is then removed from the computer and deposited at the customer address.

A device for assimilating utility meter data comprising a portable computer means having a computer housing, computer circuitry, input and output tapes connected to the computer circuitry, printout means operatively connected to the computer circuitry, and a manually held control means connected to the computer housing by a flexible coupling for actuating the computer circuitry and for putting raw data into the computer means. The manual control means includes a visible message output board connected to the computer circuitry whereby the operator can visually observe certain of the information contained in the computer as said information is imposed on the output board.

9 Claims, 3 Drawing Figures

METHOD AND MEANS OF ASSIMILATING UTILITY METER DATA

BACKGROUND OF THE INVENTION

This invention relates to a method and means for assimilating utility meter data at the meter location. Utility meters are conventionally read at the site of the meter, this information is returned to a central depository wherein the bill for utility usage is computed. The bill is then sent to the customer. This is a very cumbersome means and is quite expensive. The postage alone for this process amounts to hundreds of thousands of dollars for a given utility company. The time lag occasioned by the above process delays the payment of the bills by the customer. Some remote means have been devised so that meters can be read from a central location, but this system requires the installation of special meters which are quite expensive.

SUMMARY OF THE INVENTION

This invention comprises a method and means for assimilating utility meter data at the meter location through the use of a portable computer having both an input tape and output tape. The meter is capable of computing the bill on the spot, and the printed bill is removed from the computer and immediately deposited with the customer.

The input tape includes customer profile information including the customer's name, meter number, account number, service address, and information relating to previous meter readings and debit-credit transactions. The computer device has a handheld control means which includes a visible message output board. The operator through the use of the control means has the ability to recall information to the output board which is stored in the computer wherein the customer's name, meter number, etc. can be visually observed. The current meter information is put into the computer through the control means, the computer calculates the customer's bill, and then prints the bill whereupon it is removed by the operator and deposited with the customer.

This invention eliminates the high cost of mailing bills to the customer and eliminates the time loss occasioned by conventional means wherein the customer does not receive the bill until several days, at best, after the meter is read.

This invention therefore substantially accelerates the rate of payment from meter readings, eliminates postage costs, and greatly facilitates the meter reading record keeping burden.

DESCRIPTION OF THE PREFERRED EMBODIMENT

Figure 1:
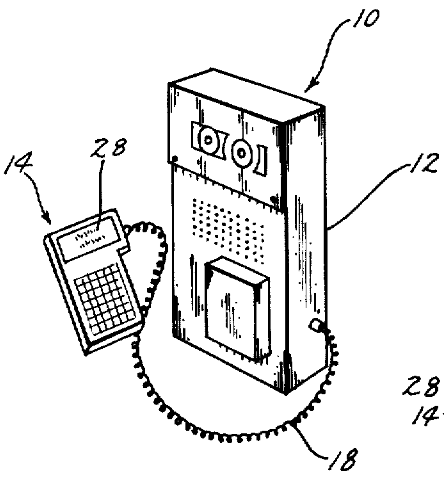
FIG. 1 is a perspective view of the portable computer which comprises a part of this invention.

A small portable computer 10 having a shoulder harnass 11 secured thereto has most of its components conventionally mounted within housing 12. A handheld manual control means 14 is connected to the housing 12 by flexible coupling 16.

Figure 4:
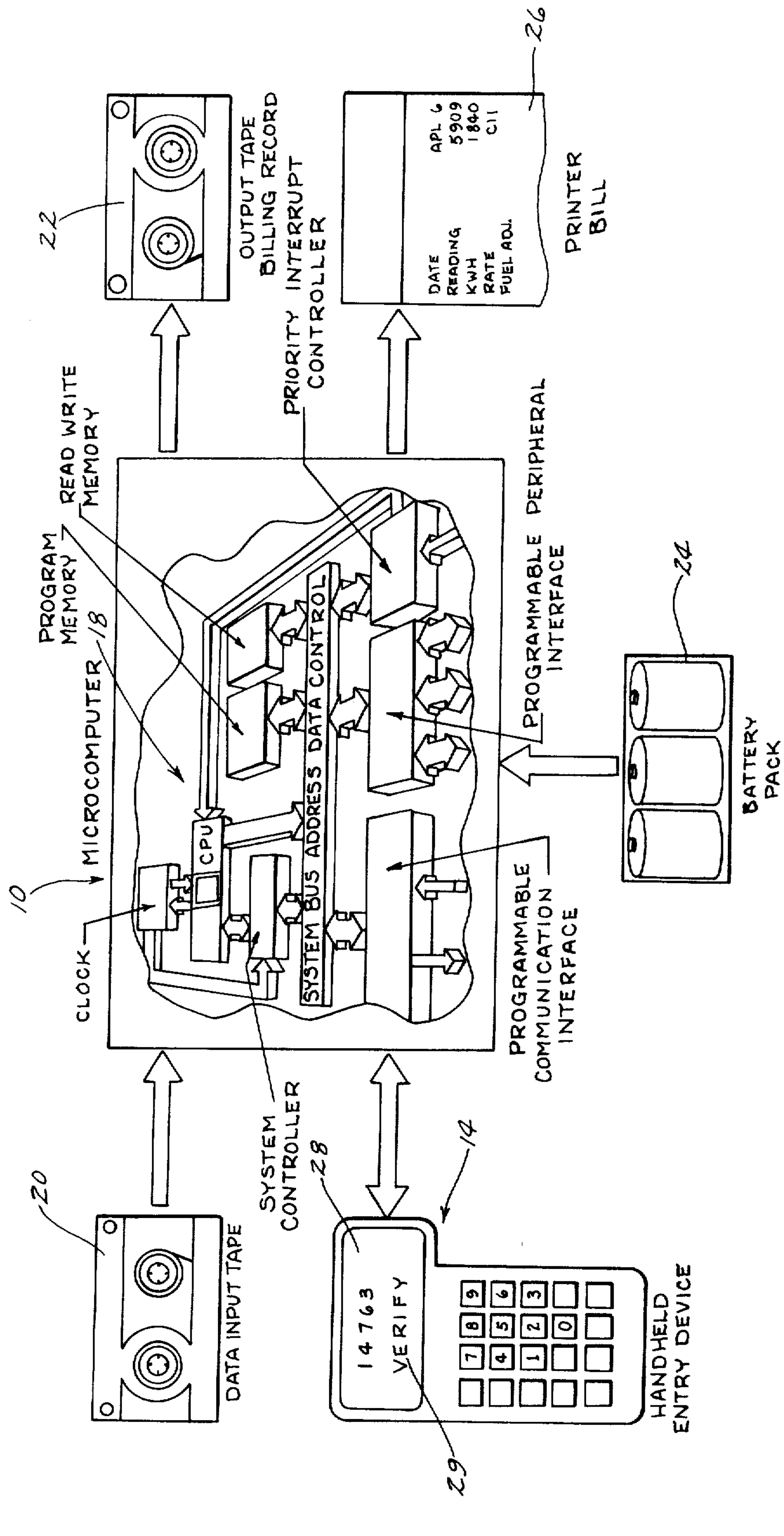
FIG. 4 is a schematic view showing the manner in which the computer means of FIG. 1 operates.

The computer 10 is comprised essentially of conventional hardware well-known in the art and the precise electronic circuitry is not disclosed herein. With reference to FIG. 4, the numeral 18 designates the computer circuitry. The housing 12 is adapted to receive input cassette tape 20 which is placed in operational contact with the computer circuitry 18 by conventional means. Similarly, output cassette tape 22 is also connected to the computer circuitry 18. A conventional battery pack 24 is mounted within the housing 12 and serves as the energy source for the computer. A printed bill 26 is produced by the computer through conventional means, and the bill 26 is conventionally detachable from the computer.

The control means 14 includes a visible message output board 28 which is comprised of a conventional character display panel such as that disclosed in U.S. Pat. No. 3,868,535 issued Feb. 25, 1975. The numeral 29 indicates a typical message output.

The control means 14 includes a plurality of depressible switches which serve to recall information from the computer for display on the output board 28, and which serve to permit raw data to be placed within the computer. The nine switches 30 are used to place raw data from the utility meter into the computer. The numbers appearing on switches 30 correspond to the value of the data being imposed into the computer from the meter itself.

Switch 32, as will be described hereafter, is the ready switch which is used to institute the process of this invention. Switch 34 actuates the printer of the computer. Switch 36 actuates the read circuitry. Switch 38 designates any peculiar irregularities pertaining to the transaction. Switch 40 is used to verify the reading. Switch 42 is used to determine special codes or instructions. Switch 44 causes the name and address of the customer to be displayed. Switch 46 is the advance switch which will be discussed hereafter. Switches 48 and 50 are special keys to be used for particular circumstances.

Figure 2:
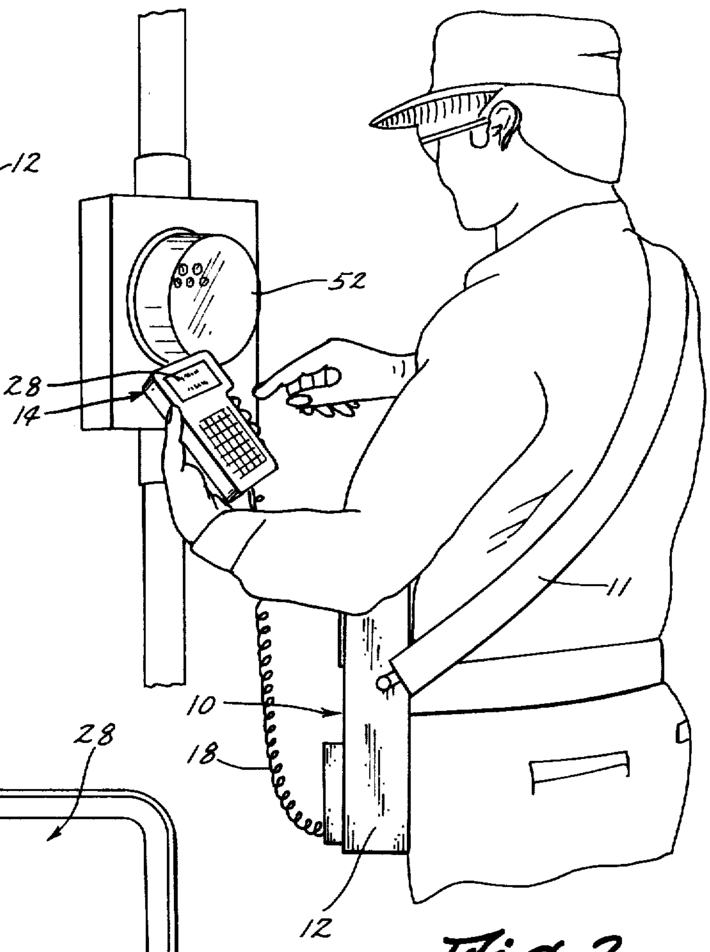
FIG. 2 is a perspective view of a operator operating the computer of FIG. 1 at the meter site.

A typical electrical utility meter 52 with typical meter dials 54 is shown in FIG. 2.

The input tape 20, sometimes referred to as the route cassette, normally would include the following customer profile information and special instructions:

| Customer Profile | Special Instructions |
|---|---|
| Account number | 1. Instruction/codes |
| Service address | Dog |
| Meter number | Key in Office |
| Name | Meter inside |
| Previous Reading Date | |
| Previous Reading/Usage | 2. Location Codes |
| Maximum Use | In House |
| Estimated Maximum Reading | |
| Rate factors/designation | 3. Special Codes |
| Debit/credit | Tampering |
| Deposit | |
| Special Information | |

This information is deposited on input tape 20 for a plurality of customers. The operator will pick up the input tape from a central depository before leaving on his route for the day. The tape is placed in the computer in operative connection with the computer circuitry 18.

Upon arriving at the location of the first utility customer, the operator will actuate the ready switch 32 which causes the service address of the customer to be displayed on board 28. Advance switch 46 will be actuated to cause any special instructions to be imposed on board 28, such as to "beware of a dog", or "see the building manager before reading the meter". Normally, the operator will continue to actuate advance switch 46 until no further information is depicted on board 28. He will continue to actuate the advance switch 42 so that at least the meter location in the house and the meter number will be depicted on board 28.

While standing before the meter as indicated in FIG. 2, the operator will read from the meter, and place the meter reading in the computer by actuating various of the switches 30. The read switch 36 is then actuated to cause the computer to calculate or otherwise take into account the following factors:

Computes the kilowatt hour usage.

Substracts the last month's reading from the new reading.

The utility rate is applied.

Applies debt/credit entries.

Applies any special factors.

Figure 3:
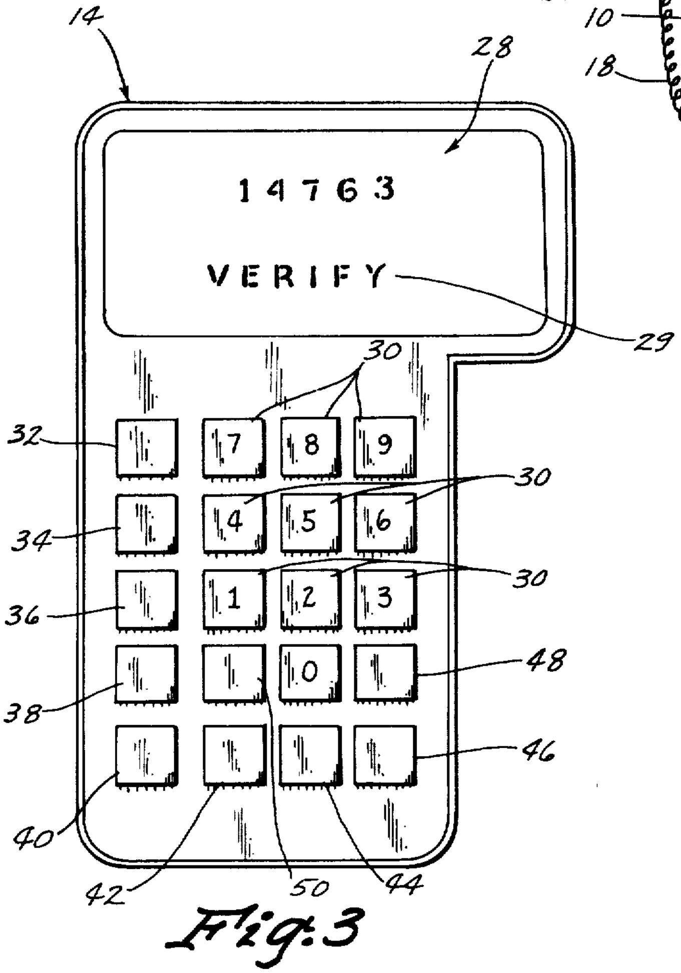
FIG. 3 is a plan view of the control means for the computer.

By programming the computer with the degree day factors for the prior thirty days, the computer will estimate what the usage should be, based upon prior usage for similar periods. If the usage does not fall within a predetermined range, the operator will be required to reconfirm the current reading before the computer prints the bill. Thus, before the computed bill is printed, the operator will actuate switch 40 to cause the computer to compare the computed bill with the estimated usage. If the computed bill is out of proportion with the estimated bill, the term "verify" will be imposed on the board 28 as indicated in FIG. 3. The operator will then reread the meter and the foregoing steps will be repeated.

If the term "verify" does not appear on screen 29, the operator actuates switch 34 to cause the bill 26 to be printed. The operator then removes the bill 26 from the computer. It is deposited in a plastic sack and placed on the door knob of the dwelling involved. As the computer prints the bill, the new billing information is recorded on output tape 22. The switch 44 can be actuated at any time to verify the name and address of the customer. The operator can impose on the output tape irregularities such as broken seals on the meter or the like by actuating switch 38. Similar information such as cross dogs or the like can be imposed on the output tape by switch 42. Keys 48 and 50 are also available for special instructions such as indicating that the battery pack is low, the paper supply is low, or the input or output tapes are low.

At the end of the day, all of the customers on the route have been billed on the day that their respective meters were read. The output tape is deposited by the operator at a central depository wherein the new information is utilized to create an input tape for the following month. If the meters are being read in a small town, the information from the output tape can be electronically transmitted through conventional means through a central depository in a remote city for processing.

The foregoing invention achieves at least the following objectives:

1. Accurate billings with less chance of mistakes and easy vertification by the customer.

2. Eliminates the necessity of inhouse preparation of the bill.

3. Eliminates the cost of delivering the bill to the customer.

4. Accelerates utilities' accounts receivable.

It should be understood that the input tape 20 and the output tape 22 are the most convenient means for achieving the respective functions of these components. However, other information storage systems could be utilized in lieu of the cassette tapes without departing from this invention.

It is, therefore, seen that this invention achieves a substantial improvement in the process of assimilating utility meter data.

I claim:

1. A method of assimilating utility meter data at the meter locations, comprising, accumulating on an input information electronic storage means customer profile information for a plurality of meter customers, said profile information including the customer identity and account information, placing said input information electronic storage means in a portable computer capable of being manually carried to the site of a given meter, said portable computer having an output information storage means and having the capability of updating, printing and presenting various of said customer profile information for said meter customers before and after receiving current customer profile information, actuating said computer to segregate and to visually present from the customer profile information for a plurality of meter customers stored on said input information electronic storage means at least the meter number and customer identity information of a given meter customer, imposing into said computer the current meter reading of said given meter customer at the site of the meter being read, actuating said computer to calculate the charge for utility usage based upon the previous meter reading and said current meter reading, actuating said computer to print a bill for said meter customer at the site of said meter based upon said calculation and imposing on said output information storage means the updated customer profile information, and depositing said bill at the service address of said given meter customer.

2. The method of claim 1 wherein said aforementioned steps are repeated for all of the customers on said input information storage means.

3. The method of claim 1 wherein said customer profile information includes average quantities of utility usage of prior periods, comparing said average quantities of utility usage with the utility usage for the period being read so that substantial variations between the average quantities of utility usage and utility usage determined for the period being read can be ascertained, and signaling the existence of such substantial variations so tha the accuracy of the utility usage for the period being read can be verified.

4. The method of claim 1 wherein the updated customer profile information on said output information storage means is transmitted to a central depository of customer information.

5. A device for assimilating utility meter data at the meter location, comprising, a portable computer means comprising a computer housing, computer circuitry, input information electronic storage means and output information electronic storage means operatively connected to said computer circuitry, said input information electronic storage means containing customer profile information for a plurality of meter customers, printout means operatively connected to said computer circuitry, and manual control means for actuating said computer circuitry and for putting raw data into said computer means, said manual control means including a visible message output board connected to said computer circuitry whereby the operator can visually observe certain of the information contained in said computer as said information is imposed on an output board, said control means including means for segregating and visually presenting on said output board customer profile information for one meter customer from the customer profile information for a plurality of meter customers stored on said input information electronic storage means.

6. The device of claim 5 wherein said control means is a hand-held control manifold connected to said computer housing by an elongated flexible coupling.

7. The device of claim 5 wherein a shoulder harness is secured to said computer housing for carrying the same.

8. The device of claim 6 wherein a shoulder harness is secured to said computer housing for carrying the same.

9. The device of claim 5 wherein said information storage means are tapes.

* * * * *

REEXAMINATION CERTIFICATE (561th)

United States Patent [19]

[11] B1 4,133,034

Etter

[45] Certificate Issued Aug. 19, 1986

[54] METHOD AND MEANS OF ASSIMILATING UTILITY METER DATA

[76] Inventor: Berwyn E. Etter, 368 Boca Ciega Point Blvd. S., Madeira Beach, Fla. 33708

Reexamination Request:
No. 90/000,154, Feb. 4, 1982

Reexamination Certificate for:
Patent No.: 4,133,034
Issued: Jan. 2, 1979
Appl. No.: 819,350
Filed: Jul. 27, 1977

[51] Int. Cl.[4] ..... G06K 1/00
[52] U.S. Cl. ..... 364/464; 235/432; 364/483; 364/900
[58] Field of Search ..... 364/200, 900, 483, 464, 364/401, 403, 709; 235/432

[56] References Cited

U.S. PATENT DOCUMENTS

| | | | |
|---|---|---|---|
| 3,422,441 | 1/1969 | Chapsky | 360/4 |
| 3,590,220 | 6/1971 | Ishida et al. | 235/432 |
| 3,654,449 | 4/1972 | Boyce | 364/709 |
| 3,842,248 | 10/1974 | Yarnell et al. | 235/419 |
| 3,932,730 | 1/1976 | Ambrosio | 364/464 |
| 3,947,665 | 3/1976 | Hundley | 364/189 |
| 4,001,807 | 1/1977 | Dallimonti | 364/189 |
| 4,016,542 | 4/1977 | Azure | 364/900 |
| 4,025,766 | 5/1977 | Ng et al. | 364/403 |
| 4,110,606 | 8/1978 | Prince et al. | 235/432 |
| 4,115,870 | 9/1978 | Lowell | 364/900 |

*Primary Examiner*—Errol A. Krass

[57] ABSTRACT

A method of assimilating utility meter data at the meter locations by accumulating on an input tape customer profile information for a plurality of meter customers, including the customer's account number, service address, meter number, customer name, previous reading date and meter reading, utility rate factors and debit/-credit transactions. The input tape is then placed in a portable computer capable of being manually carried to the site of a given meter. The portable computer has the capability of updating, printing and visually presenting various of the customer profile information before and after receiving current customer profile information. The computer is actuated to visually present at least the meter number and customer address of a given meter customer. The current meter reading is then placed in the computer which is then actuated to calculate the charge for the utility usage based upon the previous meter reading and the current meter reading. The computer is then actuated to print a bill for the meter customer, and the computer imposes on an output tape the updated customer profile information. The printed bill is then removed from the computer and deposited at the customer address.

A device for assimilating utility meter data comprising a portable computer means having a computer housing, computer circuitry, input and output tapes connected to the computer circuitry, printout means operatively connected to the computer circuitry, and a manually held control means connected to the computer housing by a flexible coupling for actuating the computer circuitry and for putting raw data into the computer means. The manual control means includes a visible message output board connected to the computer circuitry whereby the operator can visually observe certain of the information contained in the computer as said information is imposed on the output board.

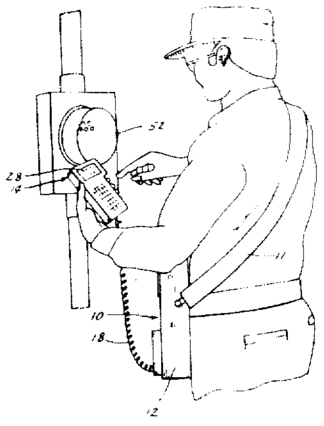

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-9 are cancelled.

* * * * *